J. C. OSGOOD, dec'd.

G. H. STARBUCK, Assignee.

DREDGING-MACHINE.

No. 6,855. Reissued Jan. 11, 1876

Attest:

H. L. Perine

J. P. Cowl

Inventor.

Jason C. Osgood, Assignor to Geo. H. Starbuck, by J. M. Izenaga his attorney.

UNITED STATES PATENT OFFICE.

GEORGE H. STARBUCK, OF TROY, NEW YORK, ASSIGNEE, BY MESNE ASSIGNMENTS, OF JASON C. OSGOOD, DECEASED.

IMPROVEMENT IN DREDGING-MACHINES.

Specification forming part of Letters Patent No. 113,691, dated April 11, 1871; reissue No. 6,855, dated January 11, 1876; application filed November 24, 1875.

*To all whom it may concern:*

Be it known that the late JASON C. OSGOOD, of Troy, New York, did, in his life-time, invent certain Improvements in Dredging-Machines or Excavators, of which the following is a specification:

The invention relates to that class of machines commonly known as the Carmichael and Osgood, and Jason C. Osgood, patterns, and others similarly constructed, so that the dipper-handle may be governed by friction instead of by the racks and pinions in common use; and it consists in certain combinations of devices calculated to attain the results desired, as will be hereinafter more fully explained and pointed out in the claims.

Figure 1:
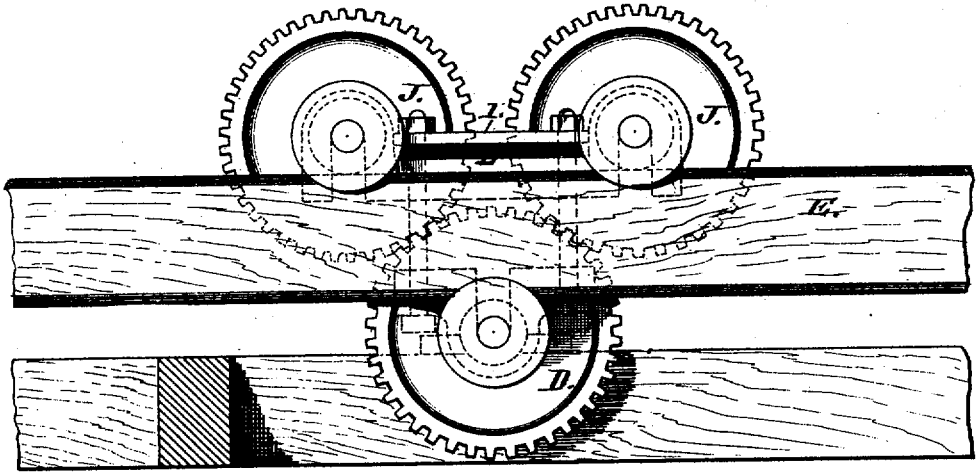
Figure 3:
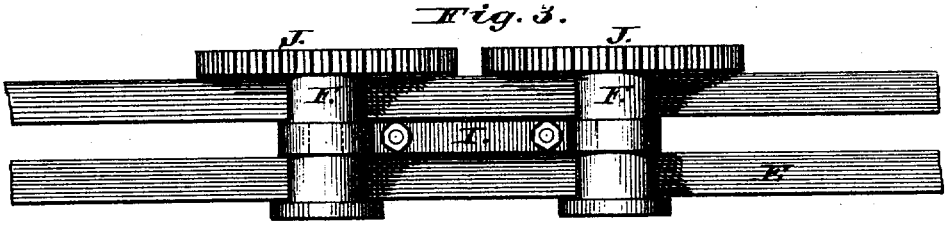
Figure 2:
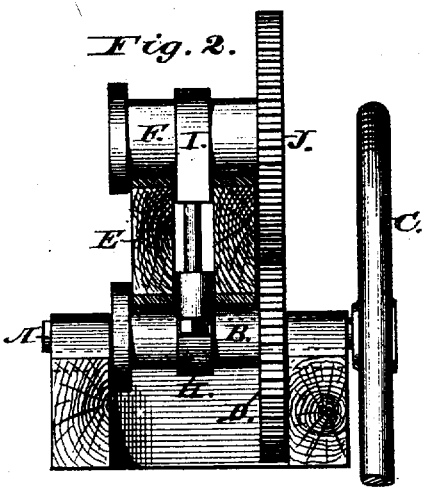
Figure 4:
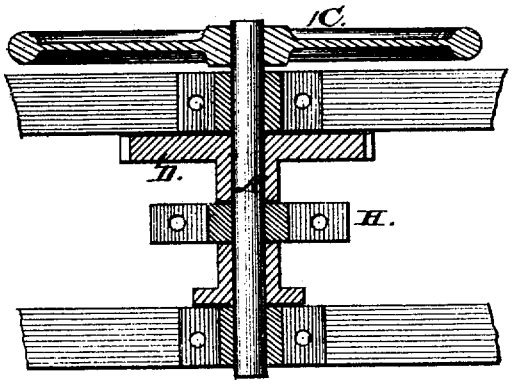

In the drawings, Figure 1 is a side elevation of the dipper-handle, with clamping attachment applied. Fig. 2 is an end view, showing dipper-handle in cross-section. Fig. 3 is a plan of dipper-handle, showing so much of clamping devices as lies above said handle. Fig. 4 is a view of the main portion of the crane, showing, also, a section of the lower clamping-yoke.

The crane and dipper-handle of the dredging-machine in general form and manner of construction are similar to those of the Carmichael and Osgood, and of the Jason C. Osgood, patterns, now in general use. The dipper-handle is controlled by means of friction, instead of by the racks and pinions, as has been heretofore done. On the main shaft A, which is mounted upon the crane-timbers, is placed a friction-roller, B. Upon the outer end of this roller and outside the crane-frame is a wheel, C, which is connected by a chain to the power, as in the Carmichael and Osgood machines now in common use. On the same roller, but within the crane-frame and secured to the roller, is the cog-wheel D. The dipper-handle E E, which is slotted, rests upon the friction-roller B. On the top of the handle are two other friction-rollers, F F. Under the roller B is a yoke, H, of sufficient size and strength to bear the required strain. Over the two upper friction-rollers F F is another yoke, I, closely and properly fitted to the rollers, and of sufficient size and strength to bear the required strain. The lower yoke H has an eye at each end, and the upper yoke has holes through the center corresponding with the eyes of the lower yoke. Through these eyes of the lower yoke and the holes of the upper yoke are put heavy bolts, to hold the two yokes together. On the upper end of the bolts and over the yoke are nuts, by which the two yokes are drawn together upon the dipper-handle, to create the friction desired. Between the nuts and the top of the upper yoke is put a packing of rubber or other elastic material, L, properly protected by iron plates, and held in place by the yoke-bolts, which pass through it and the iron plates above the rubber.

The upper rollers are separated from each other by the length of the yoke just far enough to admit a cog-wheel, J J, on one end of each, to work into the cog-wheel D on the lower roller without working into each other. These cog-wheels may be doubled—*i. e.*, there may be one on each end of the friction-rollers, if considered desirable. These rollers are made of iron, and about nine inches in diameter. The upper rollers are in length about the width of the dipper-handle, or a trifle longer. The upper and lower sides of the dipper-handle, and which come in contact with the friction-rollers, are strapped with iron to prevent the wear on the handle.

Upon both the upper and lower rollers, near their centers, as seen in drawings, are raised projections, which move between the two timbers E E of the dipper-handle. These, with the yokes, serve as guides for said handle as it is advanced or receded, keeping the same in its proper position with respect to the crane-timbers.

When the machine is at work the operation will be as follows: The wheel C being in gear, the power is transmitted to the shaft A and the friction-roller B, and through the cog-wheel D to the upper rollers F F, through the cog-wheels J J. These parts being connected, it will be obvious that if the top of wheel C, Fig. 2, be turned in either direction, the dipper-handle will be thrust in a corresponding direction, and, from the substantial method adopted for connecting the upper and lower rollers, if the wheel C be held fast the friction upon opposite sides of the dipper-handle will prevent any longitudinal displacement with respect to the crane-frame. By the use of friction, as described, the great weight of the racks and pinions is avoided, and the dipper-handle made much stronger by the continuous straps of iron in place of the racks, which must be put on in sections, and the better support and leverage of the rollers. The dipper-handle is also more easily and simply controlled, and the machinery less liable to breaks and damage, and much more easily and less expensively kept in working order.

I do not desire to be understood as laying any claim to any application of devices for working, controlling, or operating a dipper-handle of any other than a slotted form, or of the pattern substantially such as hereinbefore alluded to, as I am aware that the machine known as "clam-shell machine," and having a simple pole, has had appliances for checking or holding said pole in position by means of friction—appliances which were, however, materially different from those hereinbefore described.

What is claimed is—

1. A dipper-handle, E, constructed in the usual manner, having a slotted space between the side bars for the passage of the hoisting-chain, and on which the racks or chains are omitted, and motion of which is held, controlled, and operated by means of friction, in lieu of said racks and chains.

2. The dipper-handle of dredging-machines, as above described, having a central support or guide formed by the yoke H and yoke I, extending downward and upward into the slotted space, with adjustable bolts or clamps extending transversely through such passage, by which motion of said handle is controlled by friction.

3. The oscillating journal or trunnion of shaft A with the yokes H and I, rollers B, and bolts, forming a central partition or guide-support, and clamps for controlling the motion of said dipper-handle.

4. The trunnion or guide for a dipper-handle, having adjustable friction-rollers and a central partition or guide, as described.

5. The friction-wheels B F F, arranged to act on the dipper-handle, and receiving motion through the cog-wheels, as set forth.

6. The combination, as before set forth, of a dredging-machine dipper-handle, which is slotted, as described, and a friction-clamp adapted to hold said handle by the application of friction directly thereto, substantially as set forth.

7. In combination with the crane-timbers of an excavator of the character described, a friction-clamp mounted thereon, and adapted to permit the longitudinal adjustment of the slotted dipper-handle, or to arrest its motion by the friction applied directly upon the handle, as described, and for the purpose set forth.

8. In an excavator of the character described, the combination, with the dipper-handle, of two friction-surfaces placed on opposite sides of said handle, and capable of adjustment to vary the distance between them and the amount of friction upon said handle.

GEORGE H. STARBUCK.

Witnesses:
O. E. VAN ZILE,
A. N. BELCHER.